United States Patent
Han et al.

(10) Patent No.: US 6,828,535 B2
(45) Date of Patent: Dec. 7, 2004

(54) VEHICLE MICROWAVE OVEN WITH VIBRATION DAMPING UNIT

(75) Inventors: Yong-Woon Han, Kunpo (KR); Seong-Deog Jang, Suwon (KR); Han-Seong Kang, Suwon (KR); Joo-Yong Yeo, Suwon (KR); Dae-Sung Han, Hwasung (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/348,980

(22) Filed: Jan. 23, 2003

(65) Prior Publication Data

US 2004/0060930 A1 Apr. 1, 2004

(30) Foreign Application Priority Data

Sep. 26, 2002 (KR) ................................ 10-2002-0058416

(51) Int. Cl.[7] ................................................. H05B 6/80
(52) U.S. Cl. ........................ 219/756; 219/723; 219/679
(58) Field of Search ................................ 219/756, 722, 219/723, 736, 678, 679, 702

(56) References Cited

U.S. PATENT DOCUMENTS 3,778,578 A * 12/1973 Long et al. .................. 219/687
6,060,700 A *  5/2000 Perlman et al. ............. 219/679

FOREIGN PATENT DOCUMENTS

| JP | 64-19233 |   | 1/1989 |
| JP | 2000-346368 | * | 12/2000 |
| KR | 2001-0094637 | * | 11/2001 |

* cited by examiner

Primary Examiner—Philip H. Leung
(74) Attorney, Agent, or Firm—Staas & Halsey LLP

(57) ABSTRACT

A microwave oven for a vehicle includes an elastic vibration damping unit, and a joint unit which joins a body of the microwave oven to a vehicle through the vibration damping unit. The joint unit fixes the body of the microwave oven to the vehicle while the vibration damping unit damps vibration and impact generated from the vehicle in motion. Accordingly, inner devices of the microwave oven are prevented from being damaged by the vibration and impact.

23 Claims, 6 Drawing Sheets

US 6,828,535 B2

VEHICLE MICROWAVE OVEN WITH VIBRATION DAMPING UNIT

CROSS-REFERENCE TO RELATED APPLICATIONS

This application claims the benefit of Korean Patent Application No. 2002-58416, filed Sep. 26, 2002, in the Korean Intellectual Property Office, the disclosure of which is incorporated herein by reference.

BACKGROUND OF THE INVENTION

1. Field of the Invention

The present invention relates to microwave ovens, and more particularly, to microwave ovens for a vehicle, wherein inner devices of the microwave ovens are prevented from getting damaged by vibration and impact from movement of the vehicle.

2. Description of the Related Art

Generally, a microwave oven is an electrically operated oven which cooks food contained in its cooking cavity using high frequency electromagnetic waves ("microwave"). The microwaves are generated by an oscillation of a magnetron installed in a machine room of the microwave oven. That is, during an operation of the microwave oven, the magnetron inside the machine room radiates the microwave to the cooking cavity. The microwaves penetrate the food so as to repeatedly change a molecular arrangement of moisture laden in the food. That is, the molecules of the moisture are vibrated to generate a frictional heat within the food to cook the food.

Typically, microwave ovens are designed to be operated by AC power, and are used in a kitchen space having an AC power supply. However, in recent years, a microwave oven operated by DC power has been introduced and used in both indoors (at home or restaurants) and outdoors, especially in a mobile vehicle.

A conventional microwave oven for a vehicle is fixed to the vehicle so as to prevent the microwave oven from moving from its original fixed position regardless of vibration or impact applied to the microwave oven, during for example, where the microwave oven is carried by a moving vehicle.

However, in the conventional microwave oven for a vehicle, a joint unit such as a bolt directly joins a lower surface of a body of the microwave oven and the vehicle. In this case, the impact and vibration generated from the moving vehicle are directly transferred to the microwave oven. Accordingly, inner parts of the microwave oven including various devices which operate the microwave oven may be damaged.

SUMMARY OF THE INVENTION

Accordingly, it is an aspect of the present invention to provide a microwave oven for a vehicle provided with a vibration damping unit which damps vibration and impact generated by a moving of the vehicle, so as not to damage the microwave oven, and a joint unit which holds both the microwave oven and the vehicle.

Additional aspect and advantages of the invention will be set forth in part in the description which follows and, in part, will be obvious from the description, or may be learned by practice of the invention.

To achieve the above and/or other aspects of the present invention, there is provided a microwave oven for a vehicle, comprising a body which forms an appearance of the microwave oven, a magnetron which generates microwaves and is contained in the body, a cooking cavity which is defined inside the body to contain food therein, and a vibration damping unit which damps vibration and impact generated in response to a movement of the vehicle and fixes the body to the vehicle.

The vibration damping unit may comprise a vibration damping member which is elastic and damps the vibration and impact, and a joint member which joins the body of the microwave oven and the vehicle through the vibration damping unit.

The joint member may include a joint shaft having a female screw machined part which is provided at one end thereof so as to be fixed to the vehicle, a supporting part which is extended in a radius direction from the one end so as to be supported by the vehicle, and a male screw machined part which is provided at the other end of the joint shaft so as to be fixed to the body.

The joint member may further include a nut which is supported by the vibration damping member, and set in the male screw machined part so as to join the vibration damping unit to the body. The body of the microwave oven may include a lower plate having a penetrating hole which receives the vibration damping unit therethrough. The lower plate may include a joining member which is set corresponding to the penetrating hole so as to secure the vibration damping member and the joint member to the body.

The joining member may comprise an upper cab which is a hollow cylindrical part having an opening at one end thereof and set on the penetrating hole of the lower plate, and a lower cab which is a hollow cylindrical part having an opening at one end thereof and fitted with the opening part of the upper cab.

The vibration damping member may comprise a first damper which supports an upper surface of the nut, a second damper which supports one or more side surfaces of the nut, and a third damper which supports a lower surface of the nut.

On the other hand, the vibration damping member may comprise an upper damper which is set on an upper part of the lower plate and a lower damper which is set on a lower part of the lower plate so as to have a part of the upper damper and a part of the lower damper meet at their ends to fill the penetrating hole. In this case, the male screw machined part of the joint shaft penetrates the lower damper, the penetrating hole and the upper damper so as to fasten the nut on top of the upper damper.

The penetrating hole may include a rib part which is extended downward from the penetrating hole so as to form a ring shape. The part of the upper damper projects downward and fills a part of an area formed by the rib part and the part of the lower damper projects upward and fills the remaining part of the area formed by the rib part. The part of the upper damper and the part of the lower damper meet at the rib part.

In contrast, the vibration damping member may be a single damper which is provided on an inner side of the lower plate and has a projecting part which extends from a lower surface of the damper so as to penetrate through the penetrating hole. In this case, the male screw machined part of the joint shaft penetrates the projecting part and the penetrating hole so as to fasten the nut on top of the vibration damping member.

The microwave oven may further include a flat washer which is provided between a lower surface of the nut and an upper surface of the vibration damping member.

BRIEF DESCRIPTION OF THE DRAWINGS

The above and/or other aspects and advantages of the present invention will become more apparent by describing in detail the embodiments thereof with reference to accompanying drawings in which.

DETAILED DESCRIPTION OF THE PREFERRED EMBODIMENTS

Figure 1:
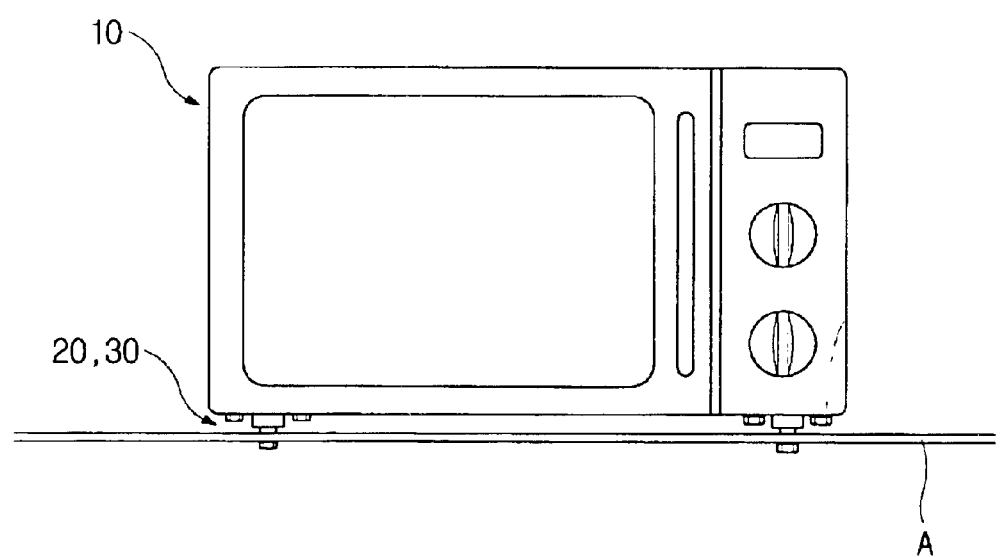
FIG. 1 is a sectional view of a microwave oven for a vehicle according to the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a sectional view of a microwave oven for a vehicle according to the present invention. As shown in FIG. 1, the microwave oven for a vehicle comprises a body 10 which forms an appearance of the microwave oven and contains various devices including a magnetron (not shown) which generates microwaves to cook food. A base plate 10B (also referred to as lower plate 10B and lower surface 10B—see FIG. 2) which form a lower surface of the body 10 is fixed to the vehicle A to prevent the body 10 from moving regardless of vibration and impact, which are generated by a movement of the vehicle A, applied to the microwave oven.

The microwave oven is fixed to the vehicle A through a vibration damping unit (to be described herein below) which damps the vibration and impact caused by, for example, the movement of the vehicle A regardless of changing a speed of the vehicle A or a surface condition of a road on which the vehicle A is traveling.

Figure 2:
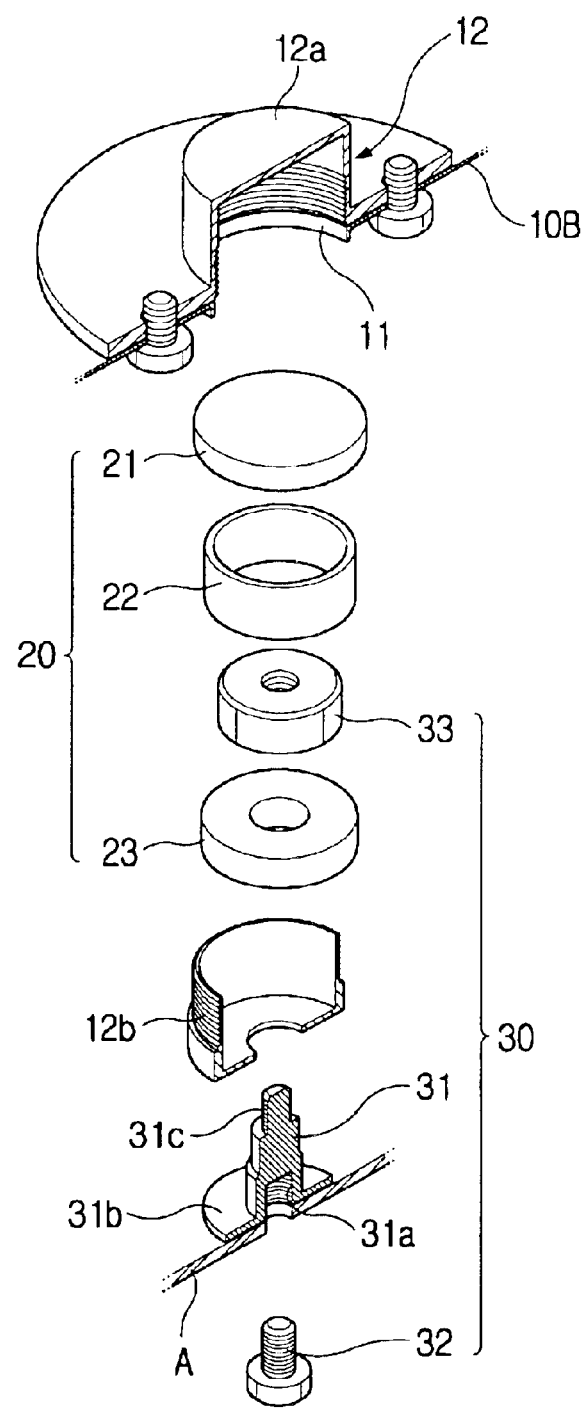
FIG. 2 is an exploded perspective view of a vibration damping unit of a microwave oven for a vehicle, according to an embodiment of the present invention.
Figure 3:
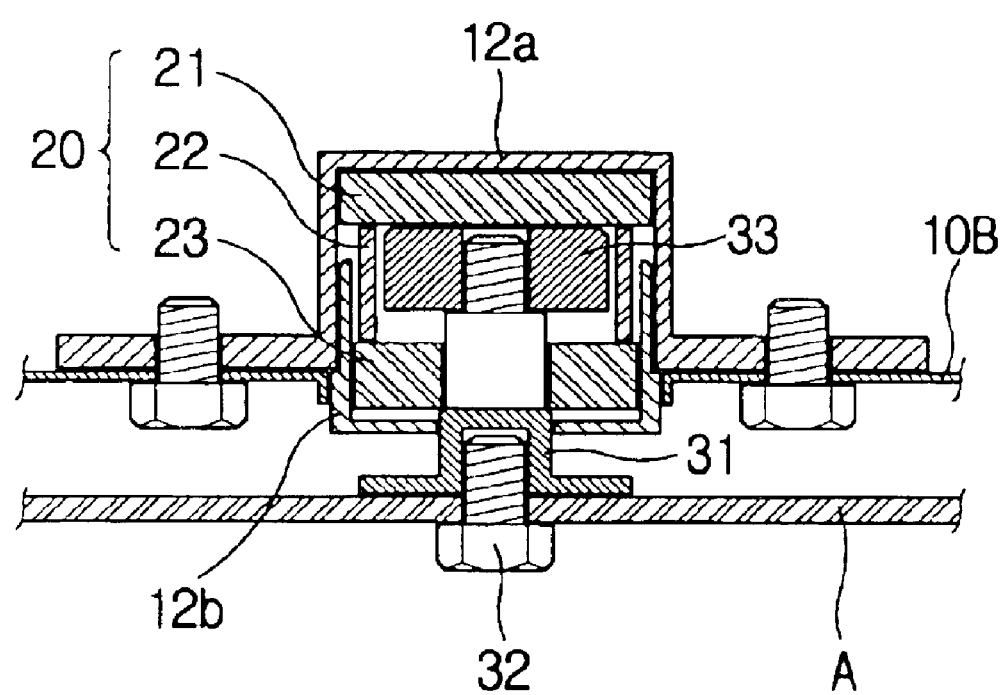
FIG. 3 is a sectional view of the vibration damping unit shown in FIG. 2.

FIGS. 2 and 3 show a vibration damping unit according to an embodiment of the present invention.

As shown in FIGS. 2 and 3, the vibration damping unit includes a vibration damping member 20 which is made of an elastic materials, for example, a rubber, so as to damp the vibration through an elasticity thereof, and a first joint member 30 which fixes the lower surface 10B of the body 10 to the vehicle A through the vibration damping member 20.

The first joint member 30 comprises a joint shaft 31, a bolt 32 and a nut 33. The joint shaft 31 fits the vehicle A at its lower end and fits the body 10 at its upper end. The bolt 32 and the nut 33 are fastened to the joint shaft 31. The joint shaft 31 comprises a female screwed part 31a which is a female screw machined at one end of the joint shaft 31 and fitted to the vehicle A, a supporting part 31b which is extended in a radius direction to support the joint shaft 31 to the vehicle A, and a male screwed part 31c which is a male screw machined at the other end of the joint shaft 31 to fit the body 10, so as to set the body 10 in the vehicle A.

The lower plate 10B of the body 10 includes a penetrating hole 11 to set the vibration damping unit, and a second joint member 12 which receives the vibration damping member 20 and the first joint member 30. The second joint member 12 comprises an upper cab 12a and a lower cab 12b. The upper cab 12a is a hollow cylindrical body with a radially extended part. The upper cab 12a is closed at its upper end, but is opened at its lower end. The lower cab 12b is a hollow cylindrical body which is opened at its upper end, but is closed at its lower end. The closed end of the lower cab 12b includes an opening to receive the male screwed part 31c of the joint shaft 31.

The second joint member 12 is fixed to the lower plate 10B using, for example, a bolt, so as to have the upper cab 12a correspond to the penetrating hole 11. The lower cab 12b is fitted to the open part of the upper cab 12a. In the second joint member12, the nut 33, which is fitted with the male screwed part 31c of joint shaft 31, is supported by the vibration damping member 20.

The vibration damping member 20 includes a first damping member 21 which supports an upper surface of the nut 33, a second damping member 22 which surrounds to support a side part of the nut 33, and a third damping member 23 which supports a lower surface of the nut 33.

The female screwed part 31a of the joint member 31 is set on the vehicle A by the bolt 32. The male screwed part 31c of the joint shaft 31 penetrates the lower cab 12b and the third damping member 23, and is fastened to the nut 33.

Where vibration and impact generated from the moving vehicle are transferred to the nut 33 through the joint shaft 31, they are met by the vibration damping member 20 provided between the joint shaft 31, the nut 33, and the joint member 12. That is, the vibration and impact applied to the nut 33 are damped by the vibration damping member 20, and less is transferred to the body 10 of microwave oven. Accordingly, the vibration damping unit prevents damage to the various devices contained in the body 10 of the microwave oven.

Figure 4:
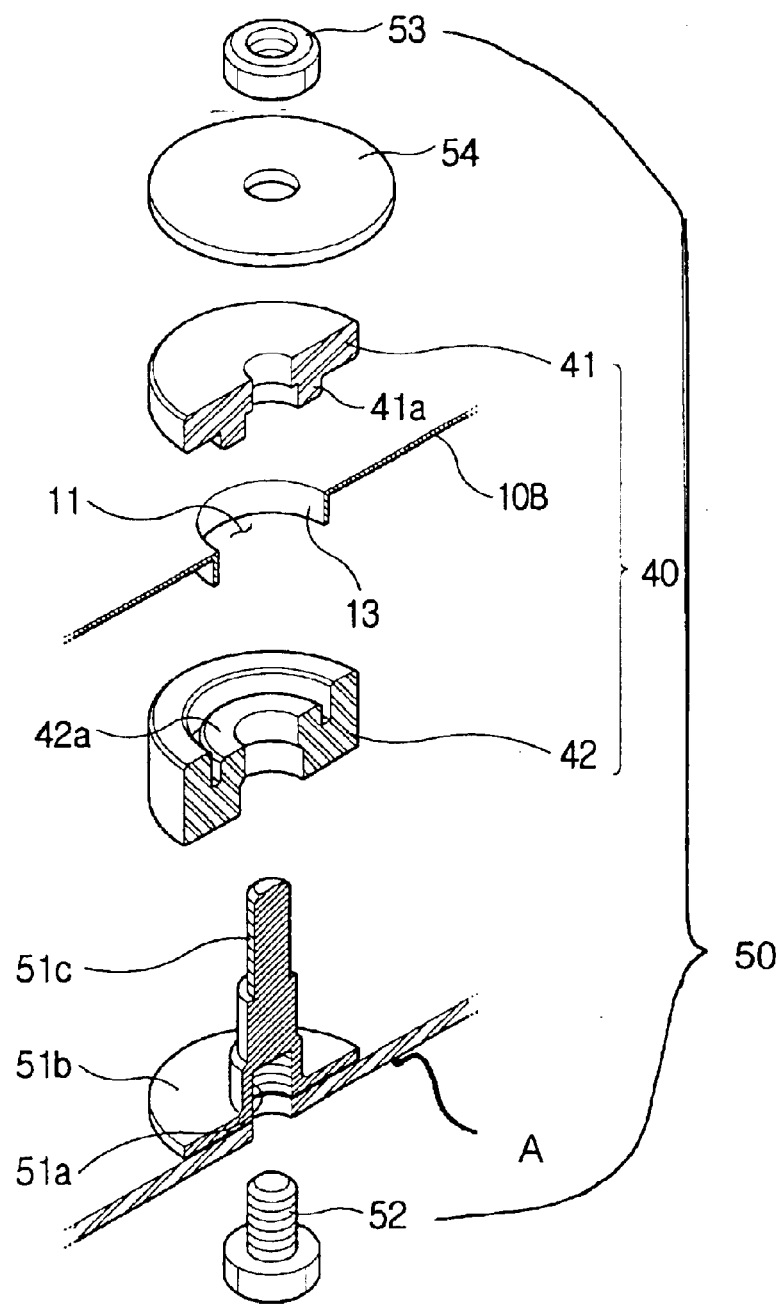
FIG. 4 is an exploded perspective view of a vibration damping unit of a microwave oven for a vehicle, according to another embodiment of the present invention.
Figure 5:
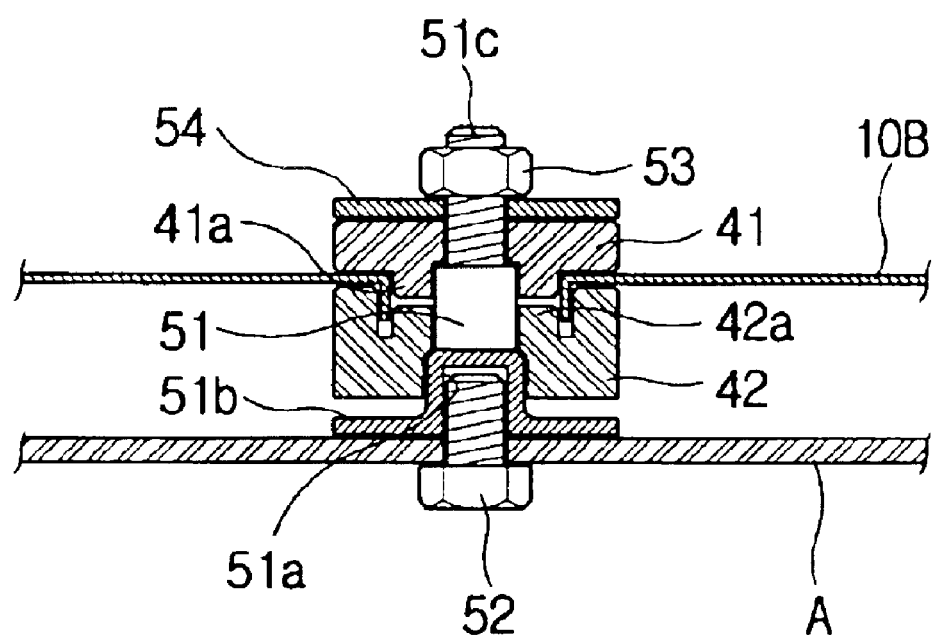
FIG. 5 is a sectional view of the vibration damping unit shown in FIG. 4.

FIG. 4 shows a vibration damping unit according to another embodiment of present invention. FIG. 5 shows a sectional view of the vibration damping unit of FIG. 4. As shown in FIGS. 4 and 5, the vibration damping unit, which is applied to a microwave oven for a vehicle, comprises a vibration damping member 40 and a joint member 50.

The vibration damping member 40 is made of an elastic material, for example, a rubber, and damps the vibration and impact through an elasticity thereof. The joint member 50 fixes the lower surface 10B of the body 10 to the vehicle A through the vibration damping member 40. Accordingly, the vibration damping unit supports and connects the microwave oven with the vehicle A through use of the vibration damping member 40 and the joint member 50.

The lower surface 10B of the body 10 includes a penetrating hole 11 and a rib part 13 which extends downward from the penetrating hole 11. The rib part 13 forms a ring shape and sets the vibration damping member 40 and the joint member 50 in the penetrating hole 11.

The vibration damping member 40 comprises an upper damping member 41 which is set on the penetrating hole 11 to cover the penetrating hole 11, and a lower damping member 42 which is set beneath the penetrating hole 11 to cover the penetrating hole 11. The upper damping member 41 has a projecting part 41a which projects downward to be fitted in the rib part 13. The lower damping member 42 has a projecting part 42a which projects upward to be fitted in the rib part 13. The projecting parts 41a and 42a meet at their respective ends in the rib part 13.

The vibration damping member 40 is set in the penetrating hole 11 by the joint member 50. The joint member 50 comprises a joint shaft 51 which is fixed to the vehicle A at an end thereof and fixed to the vibration damping member 40 at the other end, a bolt 52 which fastens the joint shaft 51 to the vehicle A, and a nut 53 which fastens the vibration damping member 40, along with the lower surface 10B of the body, to the joint shaft 51.

The joint shaft 51 includes a female screwed part 51a, a supporting part 51b, and a male screwed part 51c to connect the microwave oven to the vehicle A. The female screwed part 51a is a female screw machined at one end of the joint shaft 51, and is fixed to the vehicle A. The supporting part 51b extends from the one end of the joint shaft 51 and forms a ring shape in a radius direction to support the joint shaft 51 to the vehicle A. The male screwed part 51c is a male screw machined at the other end of the joint shaft 51, so as to fit with the vibration damping member 40.

The bolt 52 holds both the vehicle A and the female screwed part 51a of the joint shaft 51 so that the male screwed part 51c penetrates the lower damping member 42, the penetrating hole 11, and the upper damping member 41. The male screwed part 51c is fastened to the nut 53, which is on top of the upper damping member 41. Accordingly, the body 10 of the microwave oven for a vehicle is set in the vehicle A. The nut 53 may be supported by a flat washer 54, which is provided on top of the upper damping member 41.

Where vibration and impact generated from the moving vehicle are transferred to the nut 53 through the joint shaft 51, they are met by the upper damping member 41 and the lower damping member 42 provided between the lower plate 10B and the flat washer 54, and the supporting part 51b of the joint shaft 51 and the lower plate 10B of the body 10, respectively. That is, the vibration and impact applied to the microwave oven is damped by the upper damping member 41 and the lower damping member 42, and less is transferred to the body 10 of the microwave oven. Accordingly, the damping members 41 and 42 prevent the various devices contained in the microwave oven from being damaged.

Figure 6:
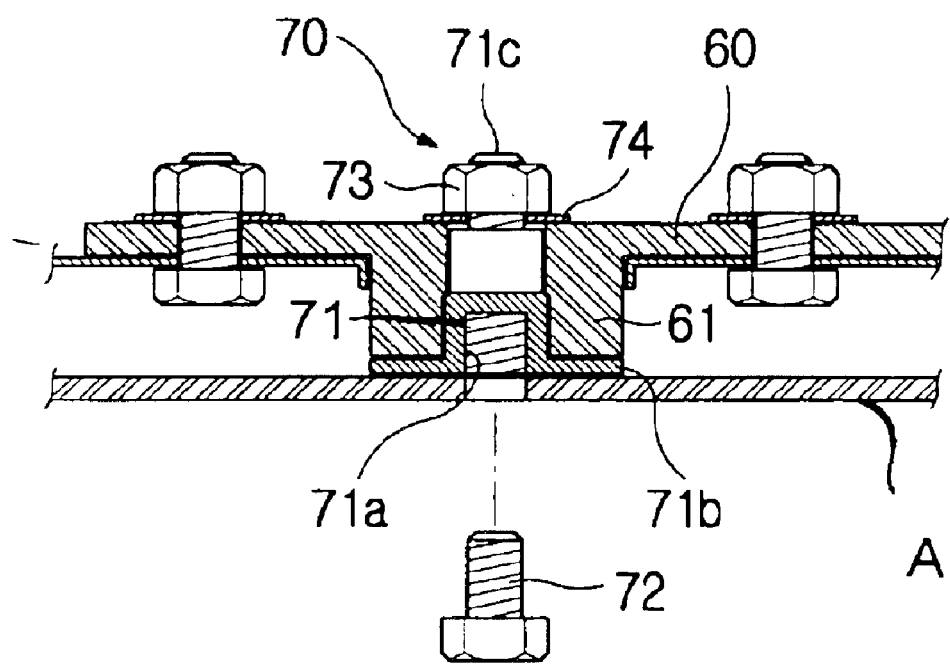
FIG. 6 is a sectional view of a vibration damping unit of a microwave oven for a vehicle, according to yet another embodiment of the present invention.

FIG. 6 shows a vibration damping unit according to yet another embodiment of the present invention. As shown in FIG. 6, the vibration damping unit, which is applied to a microwave oven for a vehicle, comprises a vibration damping member 60 and a joint member 70.

The vibration damping member 60 is made of an elastic material, for example, a rubber, and damps vibration through an elasticity thereof. The joint member 70 holds both the lower plate 10B of the body 10 and the vehicle A through the vibration damping member 60.

The lower plate 10B of the body 10 has a penetrating hole 11 so as to set the vibration damping member 60 and the joint member 70 therethrough. The vibration damping member 60 is fixed at an upper part of the lower plate 10B of the body 10 to cover the penetrating hole 11, using for example, nuts and bolts. The vibration damping member 60 has a projecting part 61 which projects downward through the penetrating hole 11.

The joint member 70 comprises a joint shaft 71 which is fixed to the vehicle A at one end thereof and fixed to the vibration damping unit 60 at the other end, a bolt 72, and a nut 73 which is fastened to the joint shaft 71. The joint shaft 71 includes a female screwed part 71a, a supporting part 71b, and a male screwed part 71c so as to set the body 10 of the microwave oven in the vehicle A. The female screwed part 71a is a female screw machined at one end of the joint shaft 71 and is fixed to the vehicle A. The supporting part 71b extends from the one of the joint shaft 71, in a radius direction, to be supported by the vehicle A. The male screwed part 71c is a male screw machined at the other end of the joint shaft 71 so as to be fixed to the lower plate 10B of the body 10 through the vibration damping member 60.

The female screwed part 71a of the joint shaft 71 is fixed to the vehicle A by the bolt 72. The male screwed part 71c of the joint shaft 71 penetrates the penetrating hole 11 and the projecting part 61 of the vibration damping unit 60, and is fastened to the body 10 using the nut 73. Thus, the body 10 of the microwave oven for a vehicle is set in the vehicle A. The nut 73 may be supported by a flat washer 74 placed between the nut 73 and the vibration damping member 60.

Where vibration and impact generated from the moving vehicle are applied to the nut 73 through the joint shaft 71, they are met by the vibration damping member 60 provided between the supporting part 71b of the joint shaft 71 and the lower plate 10B of the body 10. That is, the vibration damping member 60 damps the vibration, and less is transferred to the lower plate 10B of body 10. Accordingly, the various devices contained in the microwave oven are prevented from being damaged by the vibration and impact.

As described above, the present invention provides a microwave oven provided with a vibration damping unit which reduces the effect of the vibration applied to the microwave oven, and a joint unit which joins a body of the microwave oven to a vehicle. The joint unit joins the body to the vehicle through the vibration damping unit so as to reduce the vibration applied to the body of the microwave oven.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A microwave oven for a vehicle, comprising:
    a body that forms an appearance of the microwave oven;
    a magnetron that generates microwaves and is contained in the body;
    a cooking cavity defined inside the body to contain food therein; and
    a vibration damping unit that damps vibration and impact generated in response to a movement of the vehicle and fixes the body to the vehicle,
    wherein the vibration damping unit comprises a vibration damping member that is elastic and damps the vibration and impact, and a joint member connected to the vehicle, and inserted in and connected to the vibration damping member.

2. A microwave oven for a vehicle, comprising:
    a body that forms an appearance of the microwave oven;
    a magnetron that generates microwaves and is contained in the body;
    a cooking cavity defined inside the body to contain food therein; and
    a vibration damping unit that damps vibration and impact generated in response to a movement of the vehicle and fixes the body to the vehicle,
    wherein the vibration damping unit comprises a vibration damping member which is elastic and damps the vibration and impact, and a joint member which fixes the body to the vehicle through the vibration damping member, and the joint member includes a joint shaft comprising a female screw machined part provided at one end thereof to be fixed to the vehicle, a supporting part which is extended in a radius direction from the one end to be supported by the vehicle, and a male screw machined part provided at the other end of the joint shaft to be fixed to the body.

3. The microwave oven for a vehicle according to claim 2, wherein:

the joint member further includes a nut which is supported by the vibration damping member, and set in the male screw machined part so as to join the vibration damping unit to the body, the body includes a lower plate having a penetrating hole which receives the vibration damping unit therethrough, and the lower plate includes a joining member which is set corresponding to the penetrating hole so as to secure the vibration damping member and the joint member to the body.

4. The microwave oven for a vehicle according to claim 3, wherein the joining member comprises:

an upper cab which is a hollow cylindrical part having an opening at one end thereof and set on the penetrating hole of the lower plate; and a lower cab which is a hollow cylindrical part having an opening at one end thereof and fitted with the opening of the upper cab.

5. The microwave oven for a vehicle according to claim 4, wherein:

the vibration damping member comprises:

a first vibration damping member which supports a top surface of the nut;

a second vibration damping member which supports one or more side surfaces of the nut; and a third vibration damping member which supports a bottom surface of the nut, the first, second, and third vibration damping members and the nut are arranged in an area defined by the upper and lower cabs, and the male screw machined part of the joint shaft penetrates the lower cab, the penetrating hole, and the third vibration damping member so as to be fastened to the nut and join the nut to the third vibration damping member.

6. The microwave oven for a vehicle according to claim 3, wherein the vibration damping member comprises:

a first vibration damping member which supports a top surface of the nut;

a second vibration damping member which supports one or more side surfaces of the nut; and a third vibration damping member which supports a bottom surface of the nut.

7. The microwave oven for a vehicle according to claim 3, wherein the joint member further includes a bolt which is set in the female screw machined part to join the vibration damping unit to the vehicle.

8. The microwave oven for a vehicle according to claim 2, wherein:

the body includes a lower plate having a penetrating hole which receives the vibration damping unit therethrough, the joint member further includes a nut which corresponds to the male screw machined part, the vibration damping member comprises:

an upper damper which is set on an upper part of the lower plate;

a lower damper which is set on a lower part of the lower plate, wherein a part of the upper damper and a part of the lower damper meet at the penetrating hole, and the male screw machined part of the joint shaft penetrates the lower damper, the penetrating hole, and the upper damper so as to be fastened to the nut and join the nut to the upper damper.

9. The microwave oven for a vehicle according to claim 8, wherein:

the penetrating hole has a rib part which is extended downward from the penetrating hole so as to form a ring shape, the part of the upper damper projects downward and fills a part of an area formed by the rib part, the part of the lower damper projects upward and fills the remaining part of the area formed by the rib part, and the part of the upper damper and the part of the lower damper meet at the rib part.

10. The microwave oven for a vehicle according to claim 8, further comprising a flat washer which is provided between the nut and the vibration damping member.

11. The microwave oven for a vehicle according to claim 8, wherein the joint member further includes a bolt which is set in the female screw machined part to join the vibration damping unit to the vehicle.

12. The microwave oven for a vehicle according to claim 2, wherein:

the body includes a lower plate having a penetrating hole which receives the vibration damping unit therethrough, the joint member further includes a nut which corresponds to the male screw machined part, the vibration damping member is provided on an inner side of the lower plate and has a projecting part which extends from a lower surface of the vibration damping member so as to penetrate through the penetrating hole, and the male screw machined part of the joint shaft penetrates the projecting part and the penetrating hole so as to be fastened to the nut and join the nut to the vibration damping member.

13. The microwave oven for a vehicle according to claim 12, further comprising a flat washer which is provided between the nut and the vibration damping member.

14. The microwave oven for a vehicle according to claim 12, wherein the joint member further includes a bolt which is set in the female screw machined part to join the vibration damping unit to the vehicle.

15. A cooking apparatus for a vehicle, comprising:

a body that defines an appearance of the cooking apparatus;

a heating unit to cook food;

a cooking cavity that contains the food therein; and a vibration damping unit that prevents a transfer of vibration and impact provided to the vehicle to the cooking apparatus, and fixes the body to the vehicle, wherein the vibration damping unit comprises an elastic vibration damping member that damps the vibration and impact, and a joint unit connected to the vehicle, and inserted in and connected to the elastic vibration damping member.

16. The cooking apparatus for a vehicle according to claim 15, wherein the heating unit includes a magnetron which generates microwaves to cook the food.

17. The cooking apparatus for a vehicle according to claim 15, wherein the cooking apparatus is a DC powered cooking apparatus.

18. An apparatus, comprising:
   an elastic vibration damping member, connected to a microwave oven for a vehicle, to prevent transfer of vibration and impact to the microwave oven; and
   a joint unit, connected to the vehicle, and inserted into and connected with the vibration damping member.

19. A vibration damping unit, to connect a microwave oven to a vehicle and prevent transfer of vibration and impact to the microwave oven, the vibration damping unit comprising:
   an elastic vibration damping member, connected to the microwave oven; and
   a joint unit, distinct from the vibration damping member, connected to the vehicle, and inserted into and connected with the vibration damping member.

20. A vibration damping unit, to connect a microwave oven to a vehicle, comprising:
   a joint unit connected to the vehicle; and
   an elastic vibration damping member isolating the microwave oven from vibration and impact from the joint unit.

21. A vibration damping unit, to connect a microwave oven to a vehicle, comprising:
   an elastic vibration damping member coupled to the microwave oven, and
   a joint unit connected to the vehicle and vibrationally isolated from the microwave oven by the vibration damping member.

22. A vibration damping unit, to connect a microwave oven to a vehicle and prevent transfer of vibration and impact to the microwave oven, the vibration damping unit comprising:
   an upper cab coupled to the microwave oven;
   an elastic vibration damping member coupled to the upper cab; and
   a joint unit connected to the vehicle and coupled to the vibration damping member.

23. A vibration damping unit, to connect a microwave oven to a vehicle, comprising:
   an upper cab coupled to the microwave oven;
   a joint unit connected to the vehicle; and
   an elastic vibration damping member coupled to the upper cab and the joint unit, and damping vibration between the joint unit and the upper cab.

* * * * *